(12) United States Patent
Cariou et al.

(10) Patent No.: US 10,841,760 B2
(45) Date of Patent: Nov. 17, 2020

(54) METHODS FOR VEHICULAR COMMUNICATION IN NEXT GENERATION VEHICLE-TO-EVERYTHING (NGV) DEVICES IN MOBILITY SCENARIOS

(71) Applicant: Intel Corporation, Santa Clara, CA (US)

(72) Inventors: Laurent Cariou, Portland, OR (US); Bahareh Sadeghi, Portland, OR (US); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/407,866

(22) Filed: May 9, 2019

(65) Prior Publication Data

US 2019/0268739 A1 Aug. 29, 2019

Related U.S. Application Data

(60) Provisional application No. 62/669,024, filed on May 9, 2018.

(51) Int. Cl.
| | |
|---|---|
| *H04W 4/40* | (2018.01) |
| *H04W 4/80* | (2018.01) |
| *H04L 5/00* | (2006.01) |
| *H04W 84/12* | (2009.01) |
| *H04W 88/02* | (2009.01) |

(52) U.S. Cl.
CPC ............ *H04W 4/40* (2018.02); *H04L 5/0007* (2013.01); *H04L 5/0044* (2013.01); *H04W 4/80* (2018.02); *H04W 84/12* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2008/0049654 A1* | 2/2008 | Otal | H04W 28/06 370/311 |
| 2018/0287830 A1* | 10/2018 | Merlin | H04L 25/0224 |
| 2019/0097857 A1* | 3/2019 | Zhang | H04L 5/0092 |
| 2019/0173710 A1* | 6/2019 | Cao | H04L 27/2627 |
| 2019/0297146 A1* | 9/2019 | Noh | H04L 67/12 |
| 2019/0297622 A1* | 9/2019 | Noh | H04L 5/0053 |
| 2020/0015111 A1* | 1/2020 | Martinez | H04W 28/0236 |
| 2020/0092403 A1* | 3/2020 | Cao | H04L 69/24 |
| 2020/0162587 A1* | 5/2020 | Martinez | H04L 69/18 |
| 2020/0204417 A1* | 6/2020 | Yu | H04W 72/048 |

* cited by examiner

*Primary Examiner* — Otis L Thompson, Jr.
(74) *Attorney, Agent, or Firm* — Schwegman Lundberg & Woessner, P.A.

(57) ABSTRACT

Embodiments of a Next Generation Vehicle-to-Everything (NGV) station (STA) and method of communication are generally described herein. The NGV STA may encode a physical layer convergence procedure (PLCP) protocol data unit (PPDU) in accordance with an enhanced PHY layer protocol. The PPDU may be encoded for transmission in a dedicated short-range communication (DSRC) frequency band. The NGV STA may encode the PPDU to include a preamble, one or more data portions, and one or more midambles. The one or more midambles may occur within the PPDU after the preamble and after at least one of the data portions. The NGV STA may encode a preamble that includes an NGV SIG-A field that indicates: whether the PPDU includes the one or more midambles, and a periodicity of the one or more midambles.

20 Claims, 11 Drawing Sheets

1000

METHODS FOR VEHICULAR COMMUNICATION IN NEXT GENERATION VEHICLE-TO-EVERYTHING (NGV) DEVICES IN MOBILITY SCENARIOS

PRIORITY CLAIM

This application claims priority under 35 U.S.C. 119(e) to U.S. Provisional Patent Application Ser. No. 62/669,024, filed May 9, 2018 [reference number 1884.757PRV, AB1280-Z], which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11bd. Some embodiments relate to IEEE 802.11p. Some embodiments relate to methods, computer readable media, and apparatus to enable co-existence between devices that support IEEE 802.11bd and legacy devices, including but not limited to devices that support 802.11p.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
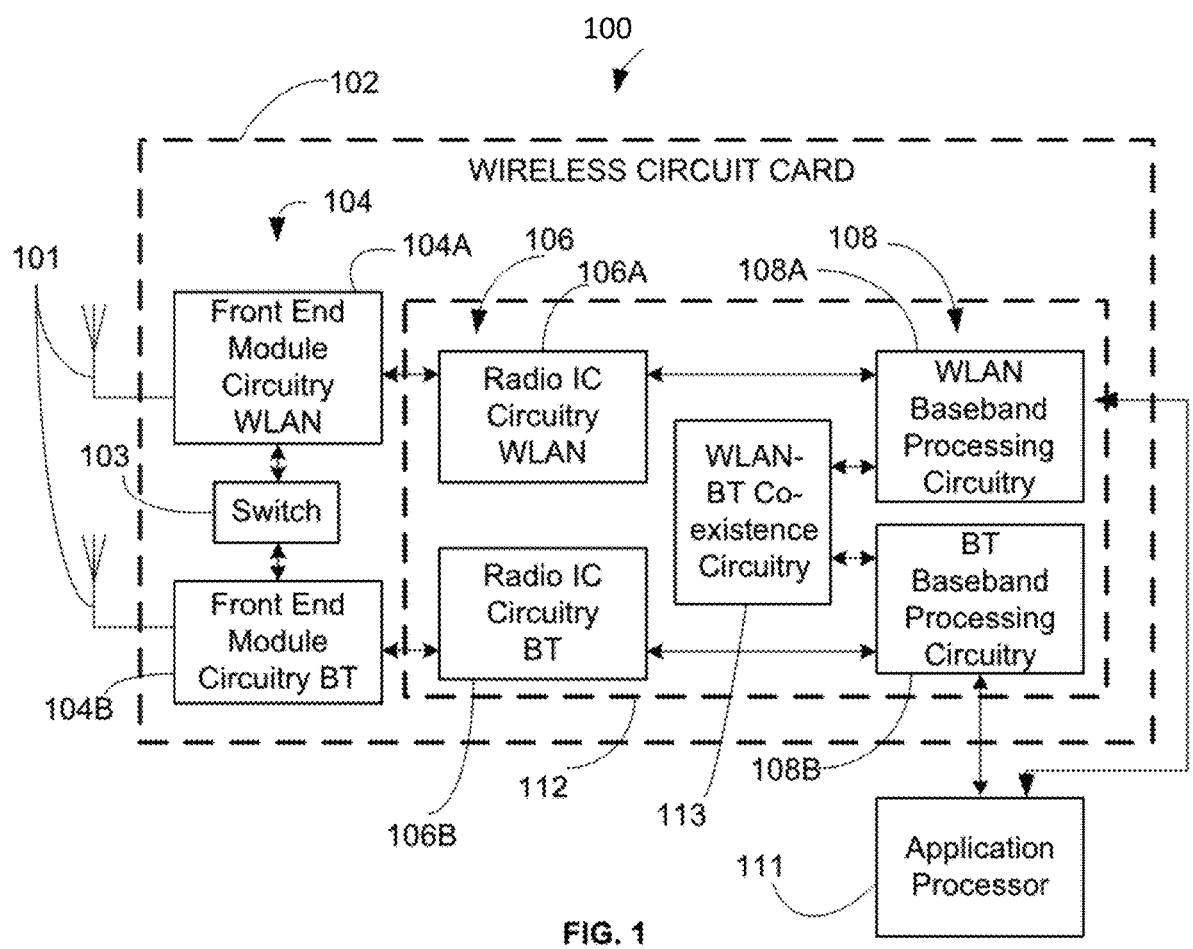
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11bd, IEEE 802.11p, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, a road side unit (RSU), on board unit (OBU) and/or other device may perform one or more of the techniques, operations and/or methods described herein.

In some embodiments, the radio architecture 100 may be configured for Next Generation Vehicle-to-Everything (NGV) communications, including but not limited to NGV communications in accordance with the IEEE 802.11bd standard. In these embodiments, the radio architecture 100 may be configured to communicate in accordance with an OFDM technique and/or OFDMA technique, although the scope of the embodiments is not limited in this respect. In some embodiments, the radio architecture 100 may be configured for communications in accordance with the IEEE 802.11p standard. In these embodiments, the radio architecture 100 may be configured to communicate in accordance with an OFDM technique and/or OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, 6 GHz and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, the radio architecture 100 may be configured for communication in an ITS band at a center frequency at or near 5.9 GHz. In some embodiments, a 320 MHz channel bandwidth may be used. The scope of the embodiments is not limited with respect to the above center frequencies however.

Figure 2:
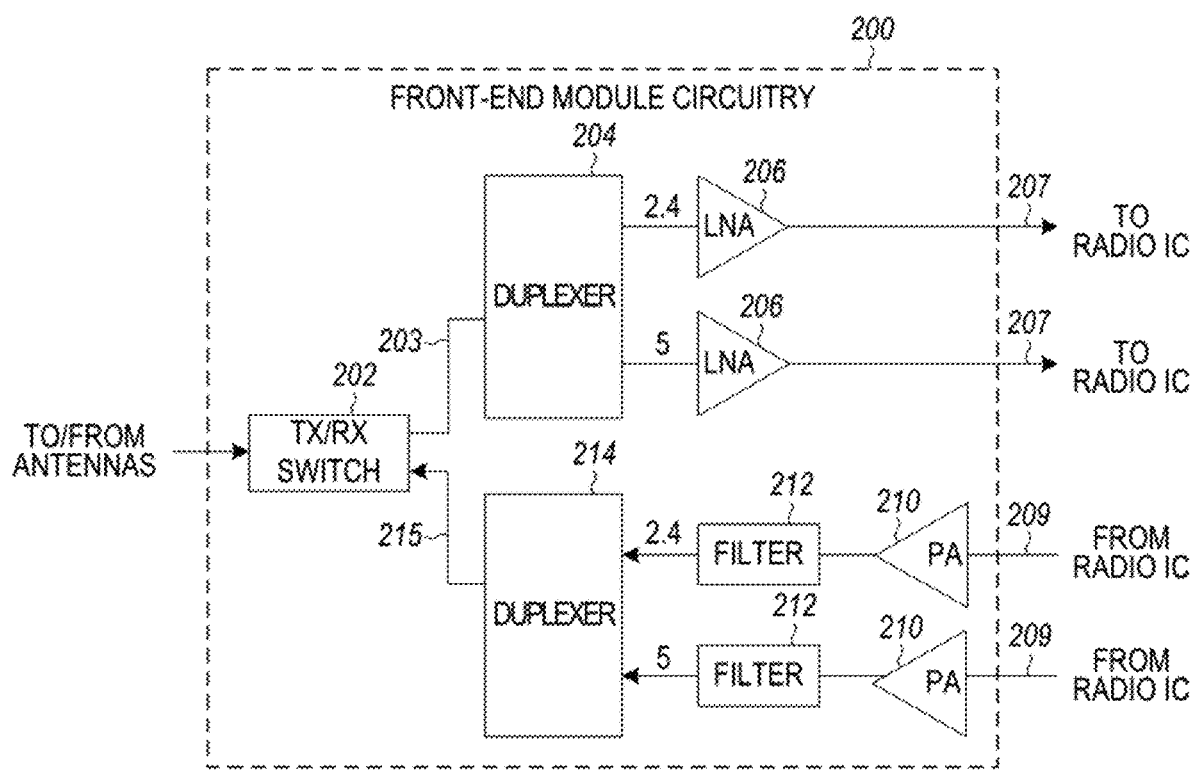
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
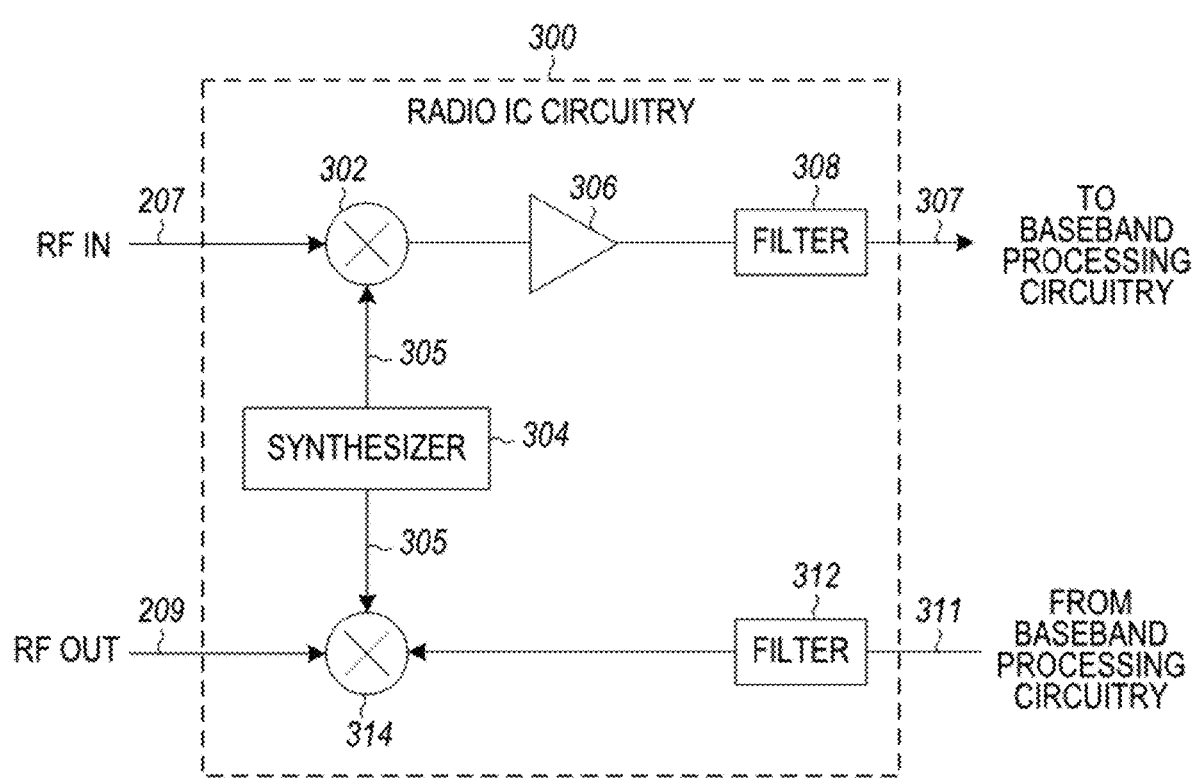
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
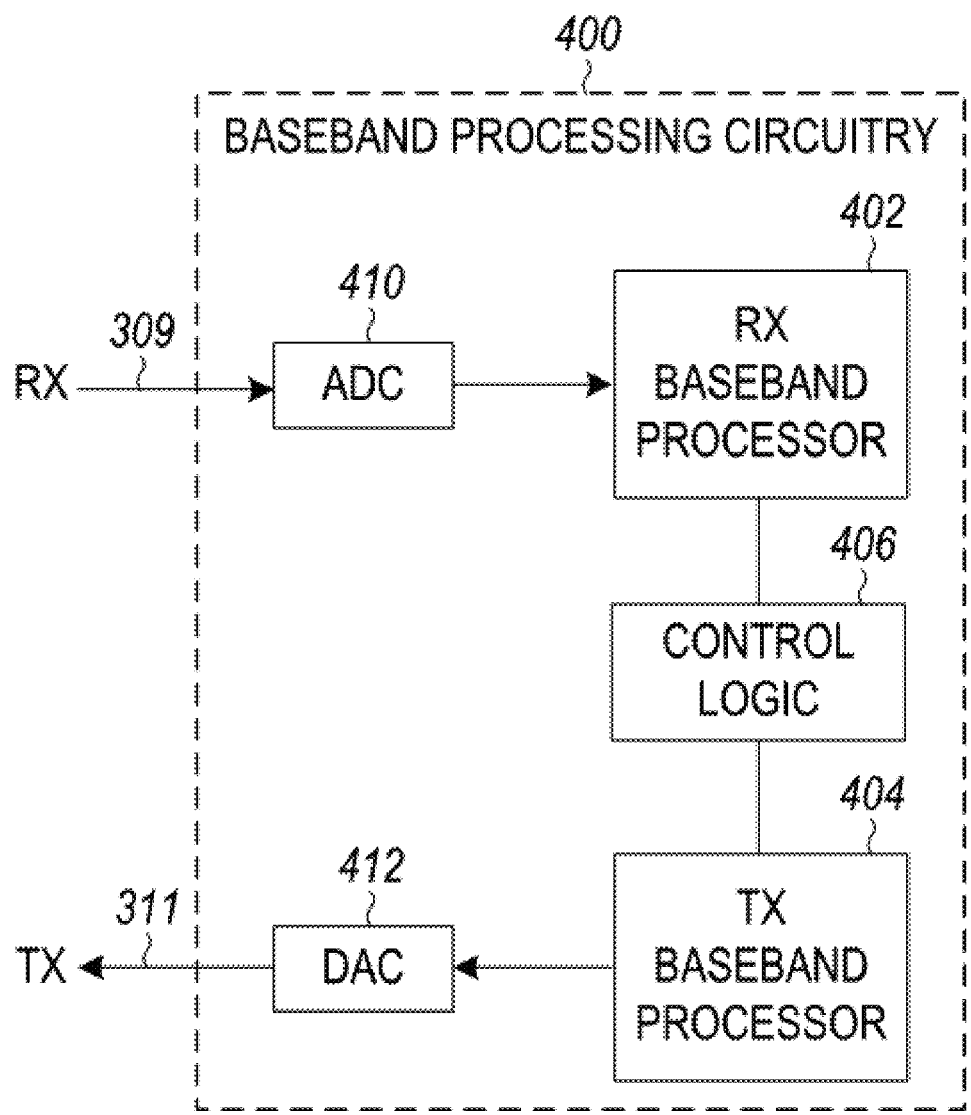
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
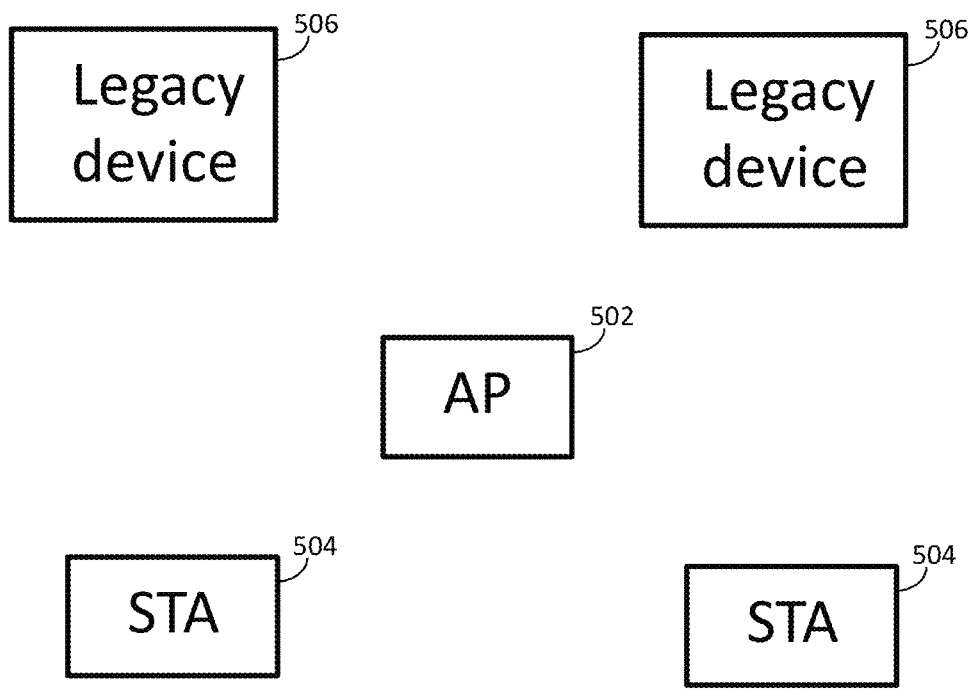
FIG. 5 illustrates a WLAN in accordance with some embodiments.

FIG. 5 illustrates a WLAN 500 in accordance with some embodiments. The WLAN 500 may include one or more APs 502, one or more Next Generation Vehicle-to-Everything (NGV) STAs 504, one or more legacy STAs 506 and/or other elements. In some embodiments, the WLAN 500 may not necessarily include all of the elements shown in FIG. 5.

In some embodiments, the legacy devices 506 may support communication in accordance with an IEEE 802.11p protocol, although the scope of embodiments is not limited in this respect. In some embodiments, the legacy devices 506 may operate in accordance with one or more IEEE 802.11 protocols, such as IEEE 802.11 a/b/g/n/p/ac/ad/af/ah/aj/ay/ax, or another legacy wireless communication standard. The legacy devices 506 may be STAs or IEEE STAs. The NGV STAs 504 may be wireless transmit and receive devices such as vehicles, OBUs, RSUs, portable devices (including devices that may be carried by pedestrians, bicycle riders and/or other(s)), cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11p, IEEE 802.11bd or another wireless protocol. In some embodiments, an NGV STA 506 may support both 802.11p (legacy) and 802.11bd (NGV), although the scope of embodiments is not limited in this respect.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments. In some embodiments, a bandwidth may be one of: 10, 20, 30, 40, 50, 60, and 70 MHz.

In some embodiments, the 26-subcarrier RU and 52-subcarrier RU are used in 10 MHz, 20 MHz, 40 MHz, and 80 MHz OFDMA formats. In some embodiments, the 106-subcarrier RU is used in the 10 MHz, 20 MHz, 40 MHz, and 80 MHz OFDMA formats. In some embodiments, the 242-subcarrier RU is used in 10 MHz, 20 MHz, 40 MHz, and 80 MHz OFDMA formats. In some embodiments, the 484-subcarrier RU is used in one or more of 10 MHz, 20 MHz, 40 MHz, and 80 MHz OFDMA formats. In some embodiments, the 996-subcarrier RU is used in one or more of 10 MHz, 20 MHz, 40 MHz, and 80 MHz OFDMA formats. In some embodiments, including but not limited to embodiments in which down-clocking of elements in another 802.11 protocol is used, sizes of the RUs in the other protocol may be divided by 2. Embodiments are not limited to the numbers/values given above for bandwidth, number of subcarriers per RU, number of subcarriers, and other aspects. Other numbers/values may be used, in some embodiments.

Some embodiments relate to HE communications. In accordance with some IEEE 802.11 embodiments, e.g, IEEE 802.11ax embodiments, an AP 502 may operate as a master station which may be arranged to contend for a wireless medium (e.g., during a contention period) to receive exclusive control of the medium for an HE control period. In some embodiments, the HE control period may be termed a transmission opportunity (TXOP). The AP 502 may transmit a HE master-sync transmission, which may be a trigger frame or HE control and schedule transmission, at the beginning of the HE control period. The AP 502 may transmit a time duration of the TXOP and sub-channel information. During the HE control period, STAs may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the AP 502 may communicate with STAs using one or more HE frames. During the HE control period, the STAs may operate on a sub-channel smaller than the operating range of the AP 502. During the HE control period, legacy stations refrain from communicating. The legacy stations may need to receive the communication from the AP 502 to defer from communicating.

In accordance with some embodiments, during the TXOP the STAs may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

In example embodiments, the NGV STA, an apparatus of the NGV STA 504, a device and/or an apparatus of the device may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-17.

In example embodiments, the NGV STA 504 and/or the AP 502 are configured to perform the methods and operations/functions described herein in conjunction with FIGS. 1-17. The term Wi-Fi may refer to one or more of the IEEE 802.11 communication standards. In some embodiments, an NGV STA may refer to an STA configured to operate as an NGV STA.

Figure 6:
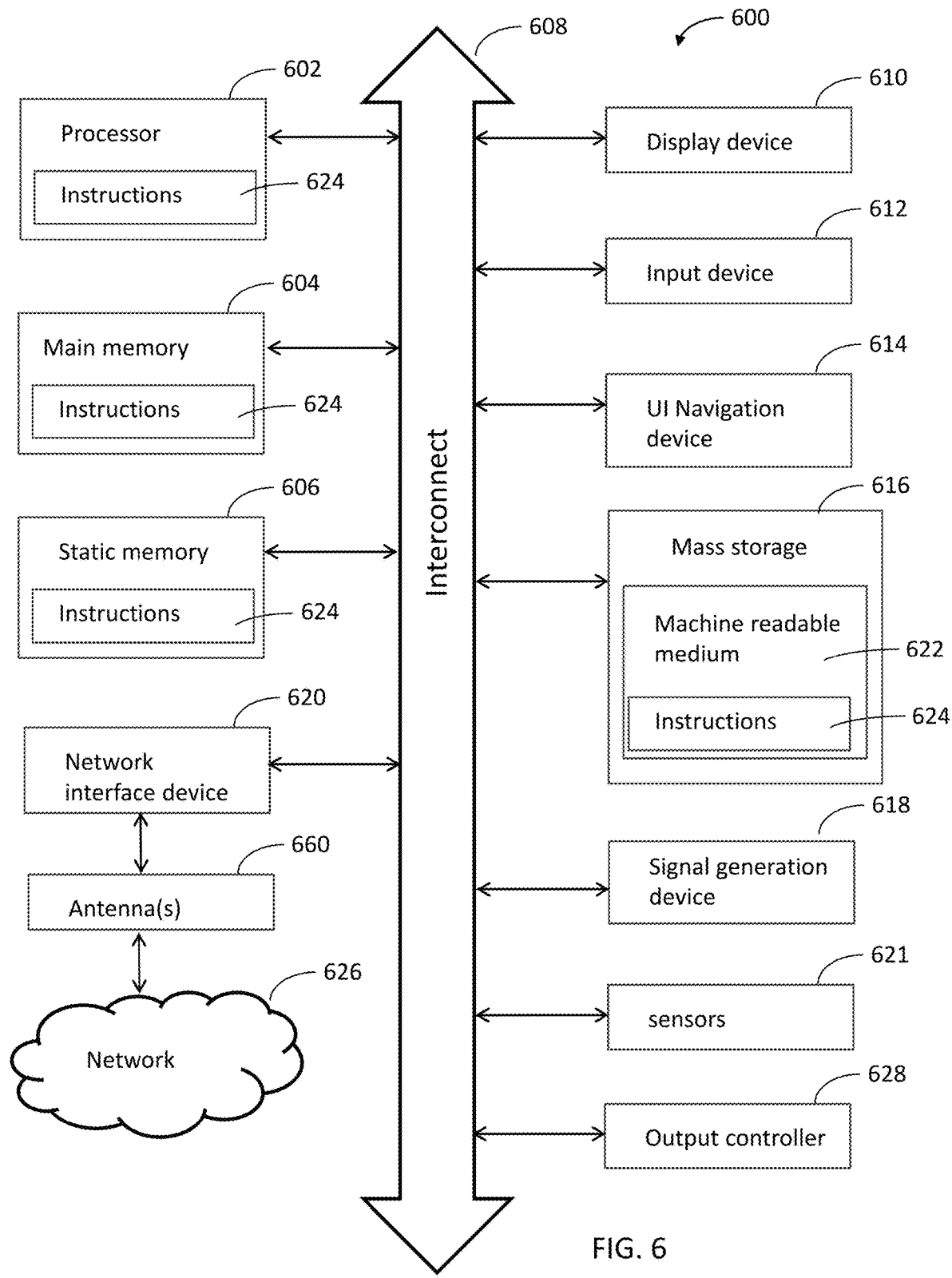
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, NGV STA 504, legacy STA 506, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. In some embodiments, devices that communicate in accordance with 802.11p and/or 802.11bd may operate in accordance with an "Outside of Context of BSS" (OCB) arrangement. In some embodiments, operation in accordance with the OCB arrangement may include operation in which the devices do not necessarily associate with an AP 502. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
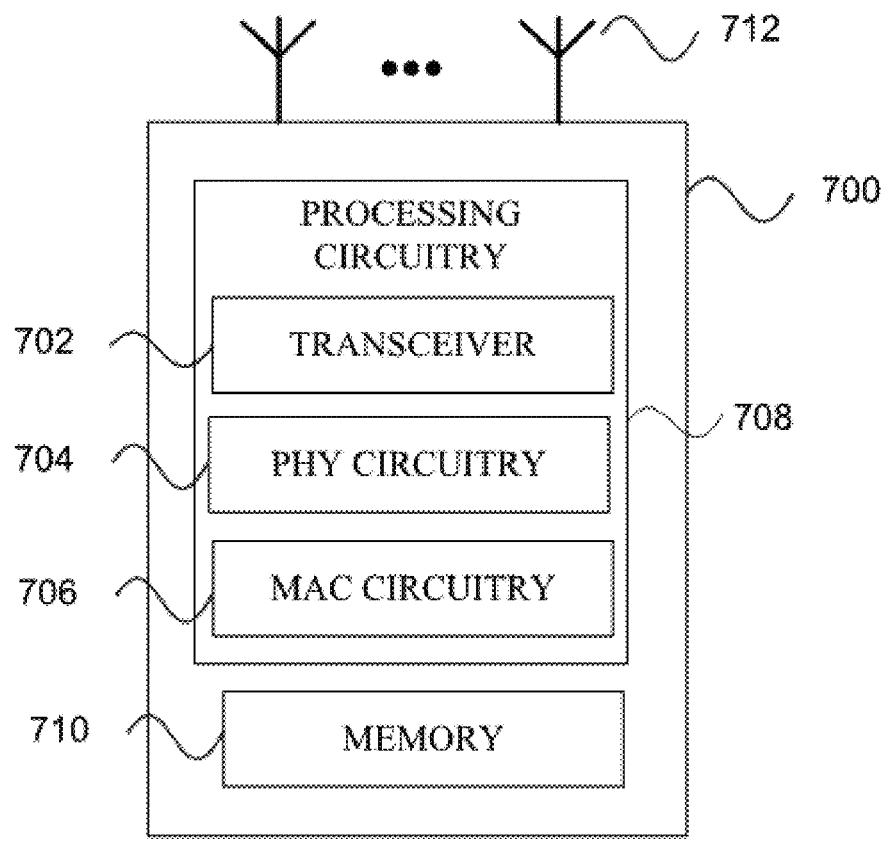
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be an NGV device. The wireless device 700 may be an AP 502, NGV STA 504, legacy STA 506 (e.g., FIG. 5). An AP 502, NGV STA 504, legacy STA 506 and/or other device may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, NGV STA 504, legacy STA 506 and/or other device) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502, NGV STA 504, legacy STA 506 and/or other device), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, the NGV STA 504 may encode a physical layer convergence procedure (PLCP) protocol data unit (PPDU) in accordance with an enhanced PHY layer protocol. The PPDU may be encoded for transmission in a dedicated short-range communication (DSRC) frequency band allocated for vehicular communication by NGV STAs 504 and legacy STAs 506. The NGV STA 504 may encode the PPDU to include a preamble, a plurality of data portions, and one or more midambles for channel estimation. One of the midambles may occur within the PPDU after the preamble and after one of the data portions and before another of the data portions. The NGV STA 504 may encode a legacy portion of the preamble to include a legacy short training field (L-STF), a legacy long training field (L-LTF), and a legacy signal field (L-SIG). The NGV STA 504 may encode a non-legacy portion of the preamble that includes an NGV SIG-A field that indicates: whether the PPDU includes the one or more midambles, and a periodicity of the one or more midambles. These embodiments are described in more detail below.

Figure 8:
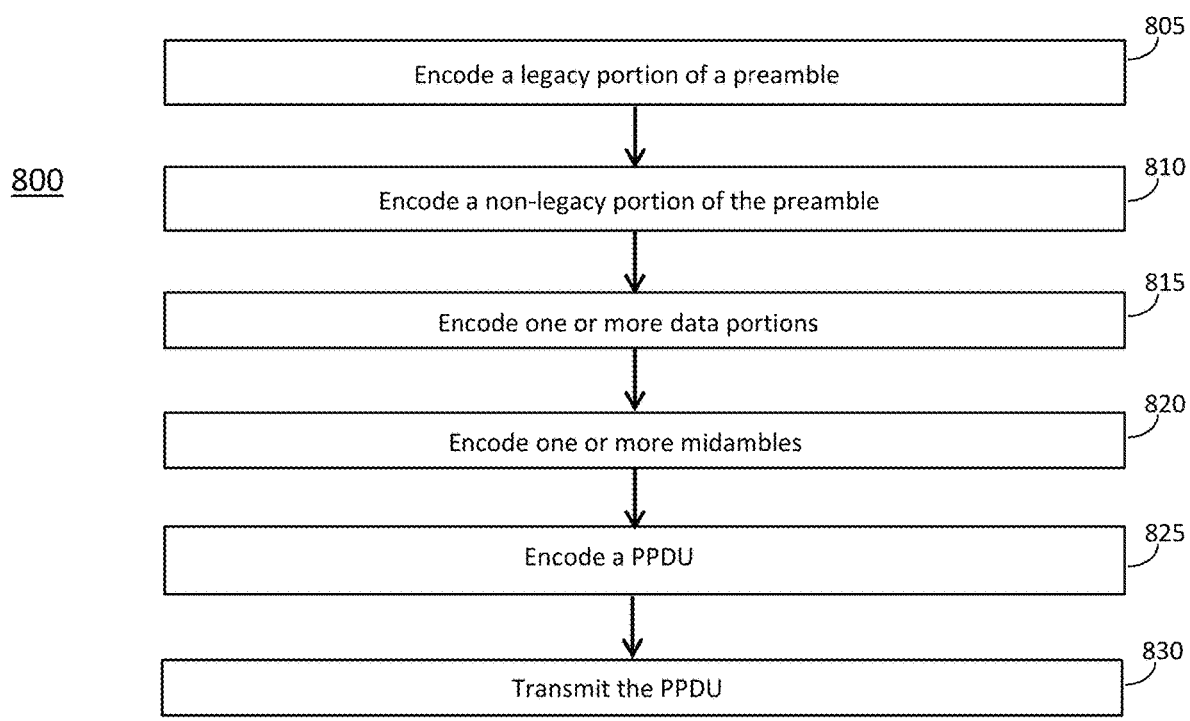
FIG. 8 illustrates the operation of a method in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to one or more figures, although it is understood that the method 800 may be practiced with any other suitable systems, interfaces and components.

In some embodiments, an NGV STA 504 may perform one or more operations of the method 800, but embodiments are not limited to performance of the method 800 and/or operations of it by the NGV STA 504. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the legacy STA 506 may perform an operation that may be the same as, similar to, reciprocal to and/or related to an operation of the method 800, in some embodiments.

The method 800 may include operations related to transmission of PPDUs, signals and/or other elements. Another method may include operations related to reception of PPDUs, signals and/or other elements, and may include one or more operations that are the same as, similar to and/or reciprocal to one or more operations of the method 800. In some embodiments, the NGV STA 504 may be configured to perform operations from both types of methods (800 and the other method that includes reception). For instance, the NGV STA 504 may be configured to encode and/or transmit a PPDU, and may perform one or more operations related to the method 800 to encode and/or transmit the PPDU. The NGV STA 504 may also be configured to decode and/or receive a PPDU from another NGV STA 504, and may perform one or more operations to decode and/or receive the PPDU.

The method 800 and other methods described herein may refer to APs 502, NGV STAs 504, legacy STAs 506 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the methods 800, 900 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the method 800 may also be applicable to an apparatus of an AP 502, an apparatus of an NGV STA 504, an apparatus of a legacy STA 506 and/or an apparatus of another device. In some embodiments, an apparatus of an NGV STA 504 may perform one or more operations of the method 800 and/or other operations.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, IEEE 802.11bd, 802.11p, IEEE 802.11ac, IEEE 802.11ax and/or other. The scope of embodiments is not limited to usage of those elements, however. In some embodiments, different elements, similar elements, alternate elements and/or other elements may be used. The scope of embodiments is also not limited to usage of elements that are included in standards.

In some embodiments, the NGV STA 504 may be arranged to operate in accordance with an NGV protocol, including but not limited to 802.11bd. In some embodiments, the NGV STA 504 may be configured for unlicensed operation, including but not limited to operation in a 6 GHz operating frequency band.

At operation 805, the NGV STA 504 may encode a legacy portion of a preamble. At operation 810, the NGV STA 504 may encode a non-legacy portion of the preamble. At operation 815, the NGV STA 504 may encode one or more data portions. At operation 820, the NGV STA 504 may encode one or more midambles. At operation 825, the NGV STA 504 may encode a physical layer convergence procedure (PLCP) protocol data unit (PPDU). At operation 830, the NGV STA 504 may transmit the PPDU.

It should be noted that there may be overlap between two or more operations shown in FIG. 8, in some embodiments. For instance, the NGV STA 504 may encode a PPDU and the NGV STA 504 may also encode one or more of: the legacy portion of the preamble, the non-legacy portion of the preamble, the one or more data portions, and the one or more midambles. In some embodiments, the NGV STA 504 may encode the PPDU to include one or more of: the legacy portion of the preamble, the non-legacy portion of the preamble, the one or more data portions, and the one or more midambles.

In some embodiments, the NGV STA 504 may encode a PPDU in accordance with an enhanced PHY layer protocol. In some embodiments, the PPDU may be encoded for transmission in a DSRC frequency band allocated for vehicular communication by NGV STAs 504 and legacy STAs 506, although the scope of embodiments is not limited in this respect. In some embodiments, the NGV STA 504 may encode the PPDU to include a preamble, one or more data portions, and one or more midambles. In some embodiments, the NGV STA 504 may encode the one or more midambles to occur within the PPDU after the preamble and after at least one of the data portions. In some embodiments, the NGV STA 504 may encode the PPDU to include a preamble, one or more data portions, and one or more midambles. In some embodiments, the NGV STA 504 may encode the PPDU to include a preamble, a plurality of data portions, and one or more midambles. In some embodiments, one of the midambles may occur within the PPDU after the preamble and after one of the data portions and before another of the data portions. In some embodiments, one or more of the midambles may occur within the PPDU after the preamble and after one of the data portions and before another of the data portions. In some embodiments, each of the midambles may occur within the PPDU after the preamble and after one of the data portions and before another of the data portions.

In some embodiments, the NGV STA 504 may encode a legacy portion of the preamble to include one or more of: a legacy short training field (L-STF), a legacy long training field (L-LTF), a legacy signal field (L-SIG) and/or other element(s). In some embodiments, the NGV STA 504 may encode a non-legacy portion of the preamble that includes an NGV SIG-A field. In some embodiments, the NGV SIG-A field may indicate one or more of: whether the PPDU includes the one or more midambles, a periodicity of the one or more midambles and/or other information.

In some embodiments, the NGV STA 504 may encode the NGV SIG-A field to include an NGV SIG-A1 field that includes one or more of: a bandwidth (BW) indicator, two reserved bits, a space-time block coding (STBC) indicator, a group ID field and/or other element(s). In some embodiments, the NGV STA 504 may encode one or more of the reserved bits and/or one or more bits of the group ID field to indicate one or more of: whether the PPDU includes the one or more midambles, and the periodicity of the one or more midambles. In some embodiments, the NGV SIG-A field and/or the elements of NGV-SIG-A field may be at least partly based on one or more elements of an IEEE 802.11ac protocol and/or other IEEE 802.11 protocol, although the scope of embodiments is not limited in this respect.

In some embodiments, the NGV STA 504 may encode the NGV SIG-A field to include an NGV SIG-A1 field that includes one or more of: a bandwidth (BW) indicator, two reserved bits, a space-time block coding (STBC) indicator, a group ID field and/or other element(s). The NGV STA 504 may further encode the NGV SIG-A field to include an NGV SIG-A2 field that includes one or more of: a single-user/multi-user (SU/MU) indicator field, a low density parity check (LDPC) extra orthogonal frequency division multiplexing (OFDM) indicator, a reserved bit and/or other element(s). The NGV STA 504 may encode one or more of the reserved bits of the NGV SIG-A1 field and/or one or more bits of the group ID field and/or the reserved bit of the NGV SIG-A2 field to indicate one or more of: whether the PPDU includes the one or more midambles, and the periodicity of the one or more midambles. In some embodiments, the NGV SIG-A field and/or the elements of NGV-SIG-A field may be at least partly based on one or more elements of an IEEE 802.11ac protocol and/or other IEEE 802.11 protocol, although the scope of embodiments is not limited in this respect.

In some embodiments, the NGV STA 504 may encode the NGV SIG-A field to include an NGV SIG-A1 field that includes one or more of: a bandwidth (BW) indicator, two reserved bits, a space-time block coding (STBC) indicator, a group ID field, a number of space time streams (NSTS)/partial association ID (AID) field and/or other element(s).

The NGV STA 504 may encode one or more of the reserved bits and/or one or more bits of the group ID field and/or one or more bits of the NSTS/partial AID field to indicate one or more of: whether the PPDU includes the one or more midambles, and the periodicity of the one or more midambles. In some embodiments, the NGV SIG-A field and/or the elements of NGV-SIG-A field may be at least partly based on one or more elements of an IEEE 802.11ac protocol and/or other IEEE 802.11 protocol, although the scope of embodiments is not limited in this respect.

In some embodiments, the NGV STA 504 may encode the PPDU to include a plurality of data portions and one or more midambles. In some embodiments, one of the midambles may be included between any two consecutive data portions. The NGV STA 504 may, if the PPDU is encoded to include the plurality of data portions and the one or more midambles, encode the NGV SIG-A1 field to indicate one or more of: that the PPDU includes one or more midambles, and the periodicity based on a number of OFDM symbols between two consecutive midambles.

In some embodiments, the NGV STA 504 may encode the PPDU to include a data portion without a midamble. The data portion may occur within the PPDU after the preamble. The NGV STA 504 may, if the PPDU is encoded to include the data portion without the midamble, encode the NGV SIG-A1 field to indicate that the PPDU does not include a midamble.

In some embodiments, the midambles may be for channel estimation, although the scope of embodiments is not limited in this respect. In some embodiments, the midambles may be used for one or more purposes, including but not limited to channel estimation, synchronization in time and/or frequency, signal quality measurement(s), and other purpose(s). In some embodiments, the one or more midambles may be based on predetermined pilot symbols.

In a non-limiting example, the NGV STA 504 may encode the PPDU for transmission in a 10 MHz channel of 64 sub-carriers spaced apart by 156.25 kHz with an orthogonal frequency division multiplexing (OFDM) symbol period of 8 micro-seconds (usec). The NGV STA 504 may encode the PPDU in accordance with a periodicity of the one or more midambles that is one of: 10 OFDM symbols, and 20 OFDM symbols. Embodiments are not limited by the example numbers/values given above, as other numbers/values may be used.

In some embodiments, the NGV STA 504 may encode the L-SIG to include a length of the PPDU to spoof the legacy STAs to defer transmissions to at least after transmission of the PPDU.

In some embodiments, the NGV STA 504 may encode the PPDU in accordance with the NGV enhanced PHY layer protocol or in accordance with a legacy PHY layer protocol to enable co-existence of the NGV STAs and the legacy STAs in the DSRC frequency band.

In some embodiments, the NGV STA 504 may encode the PPDU to include a data portion, wherein a modulation type of the data portion is selected from a set of candidate modulation types that includes 256 quadrature amplitude modulation (256-QAM).

In some embodiments, the NGV STA 504 may encode a data portion of the PPDU in accordance with a very high throughput (VHT) wireless local area network (WLAN) technique.

In a non-limiting example, the NGV STA 504 may encode the PPDU for transmission in a 10 MHz channel of 64 sub-carriers spaced apart by 156.25 kHz. The enhanced PHY layer protocol may be based on down-clocking, by a factor of 2, of time signals for a 20 MHz channel of 64 sub-carriers spaced apart by 312.5 kHz. Embodiments are not limited by the example numbers/values given above, as other values may be used.

In some embodiments, the NGV STA 504 may encode the PPDU for transmission in a 10 MHz channel of 256 sub-carriers spaced apart by 39.0625 kHz. In some embodiments, the NGV PHY layer protocol and/or legacy PHY layer protocol may be based on down-clocking, by a factor of 2, of time signals for a 20 MHz channel of 256 sub-carriers spaced apart by 78.125 kHz.

In some embodiments, the NGV STA 504 may encode the PPDU for transmission in a 20 MHz channel of 128 sub-carriers spaced apart by 156.25 kHz. In some embodiments, the NGV enhanced PHY layer protocol and/or the legacy PHY layer protocol may be based on down-clocking, by a factor of 2, of time signals for a 40 MHz channel of 128 sub-carriers spaced apart by 312.5 kHz. Embodiments are not limited to the numbers/values given above for sub-carriers, subcarrier spacings, bandwidths or other aspects. Other numbers/values may be used, in some embodiments.

In some embodiments, the NGV STA 504 may encode a PPDU in accordance with an enhanced PHY layer protocol. The PPDU may be encoded for transmission in a DSRC frequency band allocated for vehicular communication by NGV STAs 504 and legacy STAs 506, although the scope of embodiments is not limited in this respect. The NGV STA 504 may encode the PPDU to include a legacy portion of a preamble and a non-legacy portion of the preamble. The NGV STA 504 may encode the PPDU to include: one data portion without a midamble; or two or more data portions with one or more midambles. The NGV STA 504 may encode an NGV SIG-A field of the non-legacy portion of the preamble to indicate one or more of: whether the PPDU includes the one or more midambles; and if the PPDU includes the one or more midambles, a periodicity of the one or more midambles.

In some embodiments, the NGV STA 504 may encode the NGV SIG-A field to include an NGV SIG-A1 field that includes one or more of: a bandwidth (BW) indicator, two reserved bits, a space-time block coding (STBC) indicator, a group ID field, and a number of space time streams (NSTS)/partial association ID (AID) field. The NGV STA 504 may encode the NGV SIG-A field to include an NGV SIG-A2 field that includes one or more of: a single-user/multi-user (SU/MU) indicator field, a low density parity check (LDPC) extra orthogonal frequency division multiplexing (OFDM) indicator, and a reserved bit. The NGV STA 504 may encode one or more of the reserved bits of the NGV SIG-A1 field and/or one or more bits of the group ID field and/or one or more bits of the NSTS/partial AID field and/or the reserved bit of the NGV SIG-A2 field to indicate: whether the PPDU includes the one or more midambles, and the periodicity of the one or more midambles.

In some embodiments, the NGV STA 504 may encode a PPDU in accordance with an enhanced PHY layer protocol. The PPDU may be encoded for transmission in a DSRC frequency band allocated for vehicular communication by NGV STAs 504 and legacy STAs 506, although the scope of embodiments is not limited in this respect. In a non-limiting example, the NGV STA 504 may encode the PPDU for transmission in a 10 MHz channel of 256 sub-carriers spaced apart by 39.0625 kHz and in accordance with an orthogonal frequency division multiplexing (OFDM) symbol period of 32 micro-seconds (usec). Embodiments are not limited by the example numbers/values given above, as other numbers/values may be used.

In some embodiments, the NGV STA 504 may encode the PPDU to include: one data portion without a midamble; or two or more data portions with one or more midambles. The NGV STA 504 may encode the PPDU to include an NGV SIG field that includes one or more of: one or more bits dedicated to indicate whether the PPDU includes the one or more midambles, one or more bits dedicated to indicate a periodicity of the one or more midambles and/or other element(s). In some embodiments, the NGV SIG-A field and/or the elements of NGV-SIG-A field may be at least partly based on one or more elements of an IEEE 802.11ax protocol and/or other IEEE 802.11 protocol, although the scope of embodiments is not limited in this respect.

In a non-limiting example, the enhanced PHY layer protocol is based on down-clocking, by a factor of 2, of time signals for a 20 MHz channel of 256 sub-carriers spaced apart by 78.125 kHz. Embodiments are not limited by the example numbers/values given above, as other numbers/values may be used.

In some embodiments, the DSRC frequency band may include one or more control channels (CCHs) and one or more service channels (SCHs). In some embodiments, the NGV STA 504 may, if the PPDU includes traffic for an NGV service offered by the NGV STA 504, encode the PPDU for transmission on one of the SCHs. In some embodiments, the NGV STA 504 may, if the PPDU includes a basic safety message (BSM), encode the PPDU for transmission on one of the CCHs.

In some embodiments, the vehicular communication for which the DSRC frequency band is allocated may include one or more of vehicle-to-everything (V2X) communication, vehicle-to-vehicle (V2V) communication, vehicle-to-infrastructure (V2I) communication, vehicle-to-pedestrian (V2P) communication, and vehicle-to-network (V2N) communication.

In some embodiments, the NGV STA 504 may encode the PPDU to include one or more portions (such as the non-legacy portion of the preamble, data portions, midambles) that are non-compatible with the legacy STAs 506. The NGV STA 504 may encode the PPDU to include the legacy portion of the preamble, which may be compatible with the legacy STAs 506. Accordingly, one or more portions of the PPDU may be compatible with the legacy STAs 506, and one or more other portions may be non-compatible with the legacy STAs 506, in some embodiments.

In some embodiments, an apparatus of an NGV STA 504 may comprise memory. The memory may be configurable to store at least a portion of a PPDU. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the PPDU. The apparatus may include a transceiver to transmit the PPDU. The transceiver may transmit and/or receive other blocks, messages and/or other elements.

Figure 9:
FIG. 9 illustrates a dedicated short-range communication (DSRC) frequency allocation in accordance with some embodiments.
Figure 10:
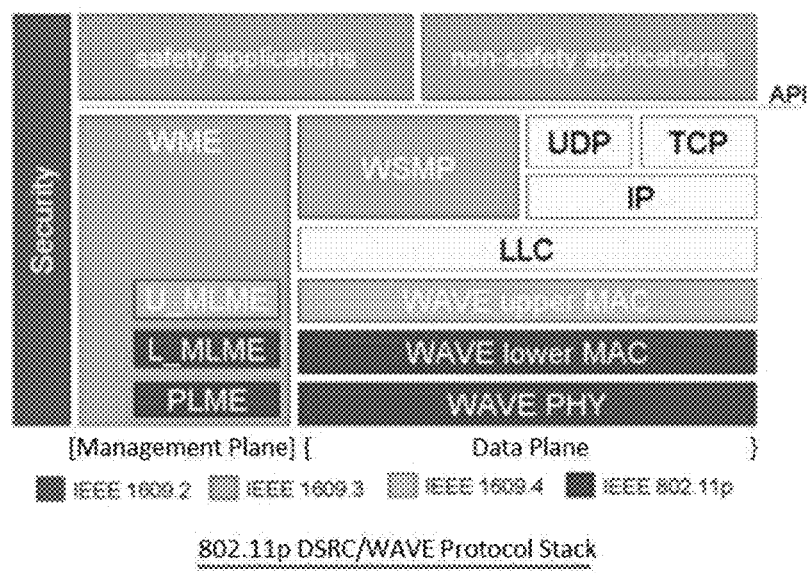
FIG. 10 illustrates a protocol stack in accordance with some embodiments.
Figure 11:
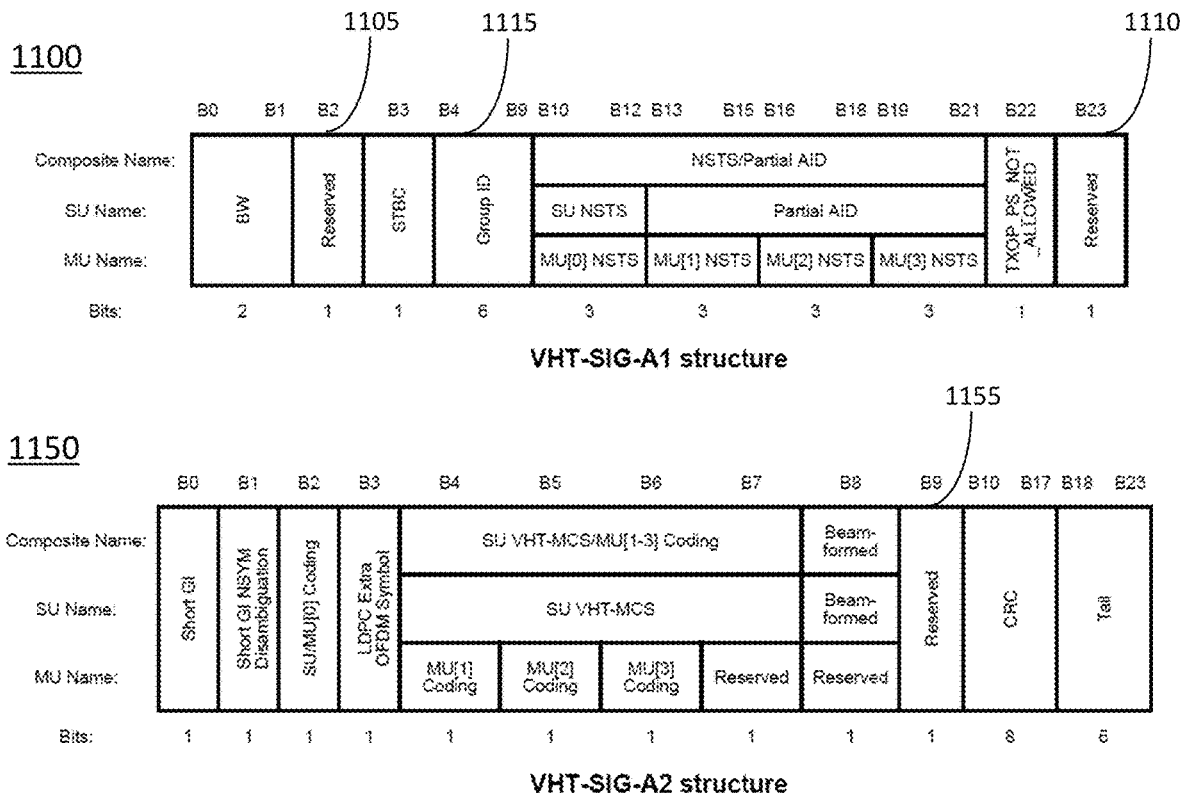
FIG. 11 illustrates example elements and fields in accordance with some embodiments.

FIG. 9 illustrates a dedicated short-range communication (DSRC) frequency allocation in accordance with some embodiments. FIG. 10 illustrates a protocol stack in accordance with some embodiments. FIG. 11 illustrates example elements and fields in accordance with some embodiments.

It should be noted that the examples shown in FIGS. 9-11 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-11. Although some of the elements shown in the examples of FIGS. 9-11 may be included in a WLAN standard, Wi-Fi standard, 802.11 standard, 802.11bd standard, 802.11p standard, 802.11ac standard, 802.11ax standard and/or other standard, embodiments are not limited to usage of such elements that are included in standards.

The DSRC band of 5.9 GHz (5.85-5.925 GHz) as depicted in FIG. 9 is reserved for vehicular communications, that is V2X (V2I/V2N/V2V/V2P) communications. The 802.11p standard is defined as the air interface and WAVE protocols (as shown in FIG. 10) have been specified on top of 802.11p to enable different vehicular services. 802.11p PHY is simply the 802.11a PHY (20 MHz, SISO) down-clocked by 2 in order to operate in 10 MHz DSRC channels. 802.11p MAC defines transmission out of context of BSS (OCB), which enables the vehicles to broadcast safety messages without association. The format of these safety messages and their content are defined in IEEE 1609 and SAE specifications, respectively.

Specifically in 1609, to ensure all cars receive high priority safety related messages, there is a dedicated control channel (CCH) designated for this purpose. These messages follow the WAVE Short Message Protocol (WSMP). In SAE however, due to an FCC allocation of V2V safety messages to Ch 172, the transmission of Basic Safety Messages (BSM) is mandated to be on SCH 172. Hence in the US these messages are transmitted on SCH 172, and in Europe these messages are transmitted on CCH (note that the channelization in EU is different). In addition to WSMP messages transmitted on CCH, 802.11p supporting devices can also announce services on the CCH.

Devices that hear the service announcements of a service provider on the CCH, can then switch to the announced Service Channel (SCH) (according to TDMA rules specified for single-radio devices) to participate in data exchange with the provider of the service. The transmissions on SCH can be WSMP packets but also be IP based. The SCH transmissions can be either unicast or broadcast. One possible use case could be the see-through application. An example is where a car A can see though car B (in front A), by having the car B send in a P2P 802.11p link to car A, its data flow of its video showing what it sees in front of it.

The packet transmissions on SCH channels can have some PHY parameters defined per packet. For WSM packets the header carries Data rate, transmission power, and the SCH channel. For IP packets there is a transmission profile that includes this information.

In order to enhance the V2X services, IEEE 802.11 started a group (Next Generation V2X, NGV) to develop the 802.11bd standard and to improve 802.11p air interface to provide higher throughput (using e.g., MIMO, higher MCSs), better reliability (using e.g., LDPC) and longer range and robustness to high mobility (using e.g., extended range (DCM), STBC, mid-ambles), among other potential enhancements.

At the time 802.11bd comes to market, 802.11p may already be deployed, especially for safety services. New cars that implement the new 802.11bd technology to benefit from higher throughput, better range, and/or other aspects may need to communicate with legacy STAs 506 already deployed using 802.11p, and with new 802.11bd STAs using 802.11bd.

As a large proportion of the traffic is a simple broadcast of small packets by every STA 504, it may not be feasible to adapt the air interface for such traffic on a per-receiving STA 504 basis. There may be issues/challenges related to enabling the services with legacy devices 506 and to benefit from the better performance of 802.11bd.

Coexistence and backward compatibility are a requirement and a strength for 802.11p and 802.11bd, but it is also a complication as we want to ensure there is no performance degradation introduced in expense of backward compatibility. For example, for specific services such as safety, we do not necessarily want to end up with having to send the broadcast messages twice, one in a legacy 802.11p format in order to be understood by legacy cars and one in the new 802.11bd format to benefit from better PHY performance (such as range and/or other aspect(s)) as this would increase the saturation of the safety channel.

In some embodiments, a new 802.11bd air interface may be defined, wherein the new air interface is understood by legacy 802.11p STAs (backward-compatible) but still provides improvements especially with regards to range: legacy compatible 11ngv PPDU format (also referred to as NGV Control PHY herein). In some embodiments, another 802.11bd air interface may also be defined, wherein the other air interface is not understood by legacy 802.11p STAs: legacy non-compatible 11ngv PPDU format (also referred to as NGV Enhanced PHY herein).

In order to enhance the V2X services, as well as to be competitive with cellular based V2X solutions, IEEE 802.11 started a group to improve 802.11p air interface to provide higher throughput (using e.g., MIMO, higher MCSs), better reliability (using e.g., LDPC) and longer range and robustness to high mobility (using e.g., extended range (DCM), STBC, mid-ambles, traveling pilots), among other potential enhancements.

In some embodiments, a new 802.11bd air interface may be used, wherein the new 802.11bd air interface may be understood by legacy 11p STAs (forward-compatible) but still provides improvements especially with regards to range: legacy compatible 11ngv PPDU format (also referred to as NGV Control PHY herein). In some embodiments, another 802.11bd air interface may be used, wherein the other 802.11bd air interface is not understood by legacy 11p STAs: legacy non-compatible 11ngv PPDU format (also referred to as NGV Enhanced PHY herein).

In some embodiments, the NGV Control PHY PPDU is created through adding CSD (cyclic shift delays) to the 802.11a PPDU. It therefore may, in some cases, enable benefit from spatial diversity at the transmitter side. In some embodiments, CSD may be used for up to 8 or even 16 antennas.

In some embodiments, the NGV Enhanced PHY PPDU can include one or more features for longer range, higher throughput and high-mobility support. Such features may include, but are not limited to, one or more of: STBC, MIMO spatial multiplexing, (beamforming), LDPC, higher QAM, mid-ambles, traveling pilots and/or other.

In some cases, 802.11ac and 802.11ax standards have designed a PPDU format that allows the support of STBC, MIMO spatial multiplexing and diversity, transmit beamforming, LDPC, high-order QAM, while being backward compatible with 802.11a. In some embodiments, the NGV Enhanced PHY may reuse one or more aspects of the 802.11ac and/or 802.11ax designs, down-clocked by 2 (and possibly one or more aspects of 802.11ah which was based on a down-clocked version of 802.11ac).

In some cases, without parameter changes and addition of some high mobility features (such as mid-ambles, travelling pilots and/or other), one or more requirements for NGV may not be satisfied. For instance, such requirements may be related to outdoor rural channel models and/or higher mobility speeds, in some cases. In a non-limiting example, requirements for mobility may include: a) 150 Miles/h: Doppler Shift 1.340 kHz, Coherence Time 315 us (using Clarke's model); b) 310 Miles/h (500 km/h): Doppler Shift 2.770 kHz, Coherence Time 152 us. In some embodiments, adjustments to one or more aspects of 802.11ac and/or 802.11ax may be used to meet those requirements, similar requirements and/or other requirements.

In some embodiments, an 802.11ac-based design may be used, and aspects of such a design are described below. A design for the NGV Enhanced PHY may be used, which is based on the mixed-mode VHT PPDU format. It is proposed herein to down-clock the 802.11ac system frequency by 2, so that a VHT 20 MHz PPDU is transformed into a NGV 10 MHz PPDU, while keeping the same number of tones. This PPDU includes the legacy preambles, which are 11a preambles down-clocked by 2, and are therefore 802.11p preamble. This allows backward compatibility and provides a way to spoof the legacy 802.11p devices (they will derive the PPDU duration from the L-SIG field and defer accordingly). It is proposed herein to add a high mobility feature to this PHY mode: either mid-ambles (defined in 802.11ax) or traveling pilots (defined in 802.11ah).

For the mid-amble option, an 802.11ax solution is to include a bit in HE-SIGA to define the presence or not of mid-ambles and another bit to indicate the periodicity between mid-ambles (every 10 OFDM symbols or every 20 OFDM symbols). It is proposed herein to repurpose some fields in the VHT-SIGA field (which becomes the NGV-SIGA field) in order to indicate the presence of mid-ambles and the periodicity of mid-ambles. The GroupID field can be repurposed, as it may be unlikely that MU operation will be used (although the scope of embodiments is not limited in this respect). One or more other fields can also be repurposed.

In order to meet the requirement with regards to coherence time of the channel in the extreme scenario of 500 km/h, keeping the option with a periodicity of 10 OFDM symbols (which means a refresh of channel estimation every 80 us) may be used, and the periodicity of 20 OFDM symbols may be used for less stringent scenarios. Alternatively, we can choose to use other periodicities.

For the travelling pilot option, an approach used in 802.11ah was to include a bit in SIG-2 structure to define the presence or not of traveling pilots. The pilot positions are based on the OFDM symbol number in 802.11ah. It is proposed herein to repurpose some fields in the VHT-SIGA field (which becomes the NGV-SIGA field) in order to indicate the presence of traveling pilots. Two approaches are proposed for indicating traveling pilot parameters. In a first approach, a single bit is required in the NGV-SIGA to indicate traveling pilots or fixed pilots. In 802.11ah, the pilots shift position was based on the modulus of the symbol number. In this first approach we use the same approach. In a second approach, it is proposed herein to add a field to indicate the presence of the traveling pilots along with a time before shift counter. As mentioned above, currently the shift is each symbol (except for STBC mode). This is proposal is a departure from 802.11ah, where we propose to have the ability to shift every N symbols. Thus the pilots will stay stationary for N symbols, then shift. It is proposed herein to have 2 bits in the NGV-SIGA to indicate this shift time. The approach is to have the two bits allow N=0 to N=3, where N=0 would mean that no shift is used (that is, fixed pilots), and N=1 is the traveling pilots as defined in 802.11ah. Thus N=2 and N=3 is added as new to allow longer dwell times in mobility channels with low to medium Doppler. The use of 2 bits is the preferred embodiment, the number of bits could be 3 (or more), where N=0 and N=1 have the same meaning, just longer dwell times for larger N.

In some embodiments, an 802.11ax-based design may be used, and aspects of such a design are described below. A design for the NGV Enhanced PHY may be used, and such a design may be based on the mixed-mode HE PPDU format from 802.11ax. It is proposed herein to down-clock its frequency by 2, so that an HE 20 MHz PPDU is transformed into a NGV 10 MHz PPDU, while keeping the same number of tones. This PPDU includes the legacy preambles, which are 802.11a preambles down-clocked by 2, and are therefore 802.11p preamble. This may enable backward compatibility and may provide a way to spoof the legacy 802.11p devices (they will derive the PPDU duration from the L-SIG field and defer accordingly).

The high mobility feature "mid-ambles" is natively designed in 802.11ax. One or more parameters of such a design may be used in some embodiments described herein. In the 802.11ax, a bit in HE-SIGA is included to define the presence or absence of mid-ambles and another bit to indicate the periodicity between mid-ambles (every 10 OFDM symbols or every 20 OFDM symbols). In order to meet one or more requirements with regards to coherence time of the channel in the extreme scenario of 500 km/h, keeping the option with a periodicity of 10 OFDM symbols (which means a refresh of channel estimation every 320 us) may not be sufficient. It is proposed herein to use different values for the periodicities. Instead of signaling a periodicity of 10 or 20 OFDM symbols, it is proposed herein that this signals a periodicity of 4 or 8 OFDM symbols (other values can also be chosen), which means a channel estimation refresh every 128 us or 256 us.

Alternatively, another option is the travelling pilot solution from 802.11ah. Some aspects of 802.11ax uses mid-ambles for Doppler. If traveling pilots are added in NGV, it is proposed herein to reuse (overload) the mid-amble bits defined in 802.11ax. Thus it is proposed herein to use the bit included in the HE-SIGA that defines the use of mid-ambles and the other bit for periodicity for the traveling pilots. Basically it would use the two bits as defined above in the 802.11ac section for traveling pilots. This proposal is a departure from 802.11ah, wherein it is proposed to have the ability to shift every N symbols. Thus the pilots will stay stationary for N symbols, then shift. It is proposed herein to use the 2 bits of the HE-SIGA to indicate the presence of traveling pilots and this shift time. The approach is to have the two bits allow N=0 to N=3, where N=0 would mean that no shift is used (that is, fixed pilots), and N=1 is the traveling pilots as defined in 802.11ah. Thus N=2 and N=3 may be added to enable longer dwell times in mobility channels with low to medium Doppler.

In some embodiments, the NGV enhanced PHY may be based on one or more aspects of 802.11ac and/or 802.11ax. In some embodiments, the NGV enhanced PHY may be based on changes/modifications to one or more aspects of 802.11ac and/or 802.11ax.

In some embodiments, signaling the presence of mid-ambles and its periodicity may be used. In some embodiments, the signaling may be based on one or more aspects of a VHT PPDU design, although the scope of embodiments is not limited in this respect.

In FIG. 11, a non-limiting example structure of a VHT-SIG-A1 1100 is illustrated. In addition, in FIG. 11, a structure of VHT-SIG-A2 1150 is illustrated. As shown in FIG. 11, in order to find 2 bits to signal the presence of midambles, and the periodicity, one or more of the following may be used: the reserved bit B2 1105 in VHT-SIG-A1 1100; the reserved bit B23 1110 in VHT-SIG-A1 1100; the group ID field 1115 in VHT-SIG-A1 1100 (which may not necessarily be used in NGV in some cases); the reserved bit B9 1155 in VHT-SIG-A2 1150; and/or other(s).

Some example calculations related to selection of a periodicity for mid-ambles or of traveling pilots are given below. In some cases, a target coherence time (such as 152 usec and/or other value) may be used, although the scope of embodiments is not limited in this respect.

For 802.11ax down-clocked by 2, a symbol duration of 32 usec, a tone spacing of 39 kHz (Doppler shift 3.4% for 150 M/h, 7% for 310 M/h), the following may be used for a time between 2 mid-ambles: a) for every 4 OFDM symbols, 128 usec (rough used/unused tones 75%), b) for every 8 OFDM symbols, 256 us (rough used/unused tones 84%). Embodiments are not limited to any of the above values, as similar values and/or other values may be used, in some cases.

For 802.11ac down-clocked by 2, a symbol duration of 8 usec, a tone spacing of 156 kHz (Doppler shift 0.86% for 150 M/h, 1.77% for 310 M/h), the following may be used for a time between 2 mid-ambles: a) for every 10 OFDM symbols, 80 us (rough used/unused tones 73%), b) for every 20 OFDM symbols, 160 us (rough used/unused tones 77%). The following may be used for a time between 2 refreshes with 802.11ah-like travelling pilot: for every 13 OFDM symbols, 104 us (rough used/unused tones 81%). Embodiments are not limited to any of the above values, as similar values and/or other values may be used, in some cases.

In some embodiments, one or more parameters related to mid-ambles (such as periodicity of the mid-ambles and/or other parameter(s)) may be tuned/specified/changed. In some embodiments, one or more parameters related to traveling pilots may be tuned/specified/changed. Such a technique may be used in difficult scenarios, although the scope of embodiments is not limited in this respect.

In some embodiments, for 802.11ax, it may be relevant to determine if a 7% Doppler shift compared to tone spacing is sufficient, and whether a lower mid-amble periodicity is to be used. In some embodiments, for 802.11ax, if a relatively low Doppler shift is relevant, a mid-amble and/or traveling pilots may be used, and may not necessarily require tuning, in some cases.

In some embodiments, the rough used/unused tones may be equal to: used subcarriers/total subcarriers*(data symb)/(data symb+midamble symb).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a Next Generation Vehicle-to-Everything (NGV) station (STA), the apparatus comprising: memory; and processing circuitry, configured to:
encode a physical layer convergence procedure (PLCP) protocol data unit (PPDU) in accordance with an enhanced PHY layer protocol, the PPDU encoded for transmission in a dedicated short-range communication (DSRC) frequency band allocated for vehicular communication by NGV STAs and legacy STAs, wherein the processing circuitry is configured to encode the PPDU to include a preamble, a plurality of data portions, and one or more midambles for channel estimation, wherein one of the midambles occurs within the PPDU after the preamble and after one of the data portions and before another of the data portions, wherein the processing circuitry is configured to encode a legacy portion of the preamble to include a legacy short training field (L-STF), a legacy long training field (L-LTF), and a legacy signal field (L-SIG), wherein the processing circuitry is configured to encode a non-legacy portion of the preamble that includes an NGV SIG-A field that indicates:

whether the PPDU includes the one or more midambles, and a periodicity of the one or more midambles, wherein the memory is configured to store at least a portion of the PPDU.

2. The apparatus according to claim 1, the processing circuitry further configured to:

encode the NGV SIG-A field to include an NGV SIG-A1 field that includes a bandwidth (BW) indicator, two reserved bits, a space-time block coding (STBC) indicator, and a group ID field; and encode one or more of the reserved bits and/or one or more bits of the group ID field to indicate:

whether the PPDU includes the one or more midambles, and the periodicity of the one or more midambles.

3. The apparatus according to claim 1, the processing circuitry further configured to:

encode the NGV SIG-A field to include:

an NGV SIG-A1 field that includes a bandwidth (BW) indicator, two reserved bits, a space-time block coding (STBC) indicator, and a group ID field, and an NGV SIG-A2 field that includes a single-user/multi-user (SU/MU) indicator field, a low density parity check (LDPC) extra orthogonal frequency division multiplexing (OFDM) indicator, and a reserved bit; and encode one or more of the reserved bits of the NGV SIG-A1 field and/or one or more bits of the group ID field and/or the reserved bit of the NGV SIG-A2 field to indicate:

whether the PPDU includes the one or more midambles, and the periodicity of the one or more midambles.

4. The apparatus according to claim 1, the processing circuitry further configured to:

encode the NGV SIG-A field to include an NGV SIG-A1 field that includes a bandwidth (BW) indicator, two reserved bits, a space-time block coding (STBC) indicator, a group ID field, and a number of space time streams (NSTS)/partial association ID (AID) field; and encode one or more of the reserved bits and/or one or more bits of the group ID field and/or one or more bits of the NSTS/partial AID field to indicate:

whether the PPDU includes the one or more midambles, and the periodicity of the one or more midambles.

5. The apparatus according to claim 1, the processing circuitry further configured to:

encode the NGV SIG-A1 field to indicate:

that the PPDU includes one or more midambles, and the periodicity based on a number of OFDM symbols between two consecutive midambles.

6. The apparatus according to claim 1, the processing circuitry further configured to:

encode the PPDU to include a data portion without a midamble, wherein the data portion occurs within the PPDU after the preamble; and if the PPDU is encoded to include the data portion without the midamble, encode the NGV SIG-A1 field to indicate that the PPDU does not include a midamble.

7. The apparatus according to claim 1, the processing circuitry further configured to:

encode the one or more midambles based on predetermined pilot symbols.

8. The apparatus according to claim 1, the processing circuitry further configured to:

encode the PPDU for transmission in a 10 MHz channel of 64 sub-carriers spaced apart by 156.25 kHz with an orthogonal frequency division multiplexing (OFDM) symbol period of 8 micro-seconds (usec), encode the PPDU in accordance with a periodicity of the one or more midambles that is one of: 10 OFDM symbols, and 20 OFDM symbols.

9. The apparatus according to claim 1, the processing circuitry further configured to:

encode the L-SIG to include a length of the PPDU to spoof the legacy STAs to defer transmissions to at least after transmission of the PPDU.

10. The apparatus according to claim 1, the processing circuitry further configured to:

encode the PPDU in accordance with the NGV enhanced PHY layer protocol or in accordance with a legacy PHY layer protocol to enable co-existence of the NGV STAs and the legacy STAs in the DSRC frequency band.

11. The apparatus according to claim 1, the processing circuitry further configured to:

encode the PPDU to include a data portion, wherein a modulation type of the data portion is selected from a set of candidate modulation types that includes 256 quadrature amplitude modulation (256-QAM).

12. The apparatus according to claim 1, the processing circuitry further configured to:

encode a data portion of the PPDU in accordance with a very high throughput (VHT) wireless local area network (WLAN) technique.

13. The apparatus according to claim 1, the processing circuitry further configured to:

encode the PPDU for transmission in a 10 MHz channel of 64 sub-carriers spaced apart by 156.25 kHz, wherein the enhanced PHY layer protocol is based on down-clocking, by a factor of 2, of time signals for a 20 MHz channel of 64 sub-carriers spaced apart by 312.5 kHz.

14. The apparatus according to claim 1, wherein:

the DSRC frequency band includes one or more control channels (CCHs) and one or more service channels (SCHs), and the processing circuitry is further configured to:

if the PPDU includes traffic for an NGV service offered by the NGV STA, encode the PPDU for transmission on one of the SCHs; and if the PPDU includes a basic safety message (BSM), encode the PPDU for transmission on one of the CCHs.

15. The apparatus according to claim 1, wherein the vehicular communication for which the DSRC frequency band is allocated includes one or more of vehicle-to-everything (V2X) communication, vehicle-to-vehicle (V2V) communication, vehicle-to-infrastructure (V2I) communication, vehicle-to-pedestrian (V2P) communication, and vehicle-to-network (V2N) communication.

16. The apparatus according to claim 1, wherein:
the processing circuitry includes a baseband processor to encode the PPDU, and
the apparatus includes a transceiver to transmit the PPDU.

17. A non-transitory computer-readable storage medium that stores instructions for execution by processing circuitry to perform operations for communication by a Next Generation Vehicle-to-Everything (NGV) station (STA), the operations to configure the processing circuitry to:
encode a physical layer convergence procedure (PLCP) protocol data unit (PPDU) in accordance with an enhanced PHY layer protocol, the PPDU encoded for transmission in a dedicated short-range communication (DSRC) frequency band allocated for vehicular communication by NGV STAs and legacy STAs,
wherein the operations further configure the processing circuitry to encode the PPDU for transmission in a 10 MHz channel of 256 sub-carriers spaced apart by 39.0625 kHz and in accordance with an orthogonal frequency division multiplexing (OFDM) symbol period of 32 micro-seconds (usec),
wherein the operations further configure the processing circuitry to encode the PPDU to include:
one data portion without a midamble, or
two or more data portions with one or more midambles,
wherein the operations further configure the processing circuitry to encode the PPDU to include an NGV SIG field that includes:
one or more bits dedicated to indicate whether the PPDU includes the one or more midambles, and
one or more bits dedicated to indicate a periodicity of the one or more midambles.

18. The non-transitory computer-readable storage medium according to claim 17, wherein the enhanced PHY layer protocol is based on down-clocking, by a factor of 2, of time signals for a 20 MHz channel of 256 sub-carriers spaced apart by 78.125 kHz.

19. An apparatus of a Next Generation Vehicle-to-Everything (NGV) station (STA), the apparatus comprising: memory; and processing circuitry, configured to:
encode a physical layer convergence procedure (PLCP) protocol data unit (PPDU) in accordance with an enhanced PHY layer protocol, the PPDU encoded for transmission in a dedicated short-range communication (DSRC) frequency band allocated for vehicular communication by NGV STAs and legacy STAs,
wherein the processing circuitry is configured to encode the PPDU to include a legacy portion of a preamble and a non-legacy portion of the preamble,
wherein the processing circuitry is configured to encode the PPDU to include:
one data portion without a midamble, or
two or more data portions with one or more midambles,
wherein the processing circuitry is configured to encode an NGV SIG-A field of the non-legacy portion of the preamble to indicate:
whether the PPDU includes the one or more midambles, and
if the PPDU includes the one or more midambles, a periodicity of the one or more midambles.

20. The apparatus according to claim 19, the processing circuitry further configured to:
encode the NGV SIG-A field to include an NGV SIG-A1 field that includes a bandwidth (BW) indicator, two reserved bits, a space-time block coding (STBC) indicator, a group ID field, and a number of space time streams (NSTS)/partial association ID (AID) field;
encode the NGV SIG-A field to include an NGV SIG-A2 field that includes a single-user/multi-user (SU/MU) indicator field, a low density parity check (LDPC) extra orthogonal frequency division multiplexing (OFDM) indicator, and a reserved bit; and
encode one or more of the reserved bits of the NGV SIG-A1 field and/or one or more bits of the group ID field and/or one or more bits of the NSTS/partial AID field and/or the reserved bit of the NGV SIG-A2 field to indicate:
whether the PPDU includes the one or more midambles, and
the periodicity of the one or more midambles.

* * * * *